United States Patent
Aikoh et al.

(10) Patent No.: US 10,298,715 B2
(45) Date of Patent: May 21, 2019

(54) DISTRIBUTED PROCESSING SYSTEM, TASK PROCESSING METHOD, AND STORAGE MEDIUM

(71) Applicant: HITACHI, LTD., Tokyo (JP)

(72) Inventors: Kazuhide Aikoh, Tokyo (JP); Masafumi Kinoshita, Tokyo (JP); Go Kojima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 86 days.

(21) Appl. No.: 15/554,574

(22) PCT Filed: Apr. 15, 2015

(86) PCT No.: PCT/JP2015/061594
§ 371 (c)(1),
(2) Date: Aug. 30, 2017

(87) PCT Pub. No.: WO2016/166844
PCT Pub. Date: Oct. 20, 2016

(65) Prior Publication Data
US 2018/0041600 A1    Feb. 8, 2018

(51) Int. Cl.
*G06F 11/07*     (2006.01)
*H04L 29/08*     (2006.01)
*G06F 11/20*     (2006.01)
*G06F 9/50*     (2006.01)

(52) U.S. Cl.
CPC ........ *H04L 67/2842* (2013.01); *G06F 9/5027* (2013.01); *G06F 11/20* (2013.01); *G06F 11/203* (2013.01); *G06F 2201/805* (2013.01); *G06F 2201/82* (2013.01)

(58) Field of Classification Search
CPC .......................... G06F 11/2025; G06F 11/2033
USPC .................................................. 714/4.11, 6.3
See application file for complete search history.

(56) References Cited

U.S. PATENT DOCUMENTS

| | | | |
|---|---|---|---|
| 2012/0084597 A1 | 4/2012 | Yasui et al. | |
| 2015/0039834 A1* | 2/2015 | Cudak ................... | G06F 12/084 711/130 |
| 2015/0161051 A1* | 6/2015 | Aikoh ................. | G06F 12/0811 711/119 |
| 2015/0222704 A1* | 8/2015 | Kipp ................... | H04L 67/1097 709/213 |
| 2017/0329720 A1* | 11/2017 | Bedi ...................... | G06F 12/123 |

(Continued)

FOREIGN PATENT DOCUMENTS

JP     2012-073975 A     4/2012

OTHER PUBLICATIONS

International Search Report for WO 2016/166844 A1, dated Jul. 14, 2015.

*Primary Examiner* — Chae M Ko
(74) *Attorney, Agent, or Firm* — Volpe and Koenig, P.C.

(57) ABSTRACT

The present invention relates to a distributed processing system having a master node and a plurality of worker nodes. Each worker node has an assigned identifier. A worker node caches in its own memory first output data, which is the result of the execution of a first task, and copies said first output data to another worker node. The master node selects, on the basis of the identifier information of the first worker node, a worker node to which to assign a second task, wherein the first output data is used as input data.

13 Claims, 14 Drawing Sheets

(56) References Cited

U.S. PATENT DOCUMENTS

2017/0351584 A1* 12/2017 Griffith ............... G06F 11/1471
2018/0054482 A1* 2/2018 Ruiz ................... H04L 67/1097

* cited by examiner

F I G. 4

2121        TASK MANAGEMENT TABLE 21211 21212 21213 21214 21215 21216 21217

| TASK ID | PROCESSING | INPUT DATA | OUTPUT DATA | CACHE REQUEST | STATE | PRIORITY |
|---|---|---|---|---|---|---|
| T1 | load | file1 | D1 | × | PROCESSED | HIGH |
| T2 | filter | D1 | D2 | ○ | PROCESSING | HIGH |
| T3 | count | D2 | D3 | × | PROCESSING | MIDDLE |
| T4 | filter | D2 | D4 | ○ | ALLOCATED | LOW |
| T5 | map | D4 | D5 | × | UNALLOCATED | LOW |

F I G. 5

TASK PLACEMENT
MANAGEMENT TABLE 2122    21221    21222

| TASK ID | WORKER NODE ID |
|---|---|
| T1 | W2 |
| T2 | W1 |
| T5 | W2 |

F I G. 6

CACHE MANAGEMENT TABLE 2123    21231    21232

| DATA ID | WORKER NODE ID |
|---|---|
| D1 | W2 |
| D2 | W1 |
| D5 | W2 |

FIG. 7

5121  TASK MANAGEMENT TABLE

| TASK ID | PROCESSING | INPUT DATA | OUTPUT DATA | CACHE REQUEST | STATE | PRIORITY |
|---|---|---|---|---|---|---|
| T2 | filter | D1 | D2 | O | PROCESSING | HIGH |

LOCAL CACHE MANAGEMENT TABLE 5122  51221

| DATA ID |
|---|
| D2 |

FIG. 9

COPY DATA MANAGEMENT TABLE 5123  51231 51232 51233 51234

| DATA ID | COPY DATA ID | WORKER NODE ID | STATE |
|---|---|---|---|
| D2 | M2 | W1 | M |
|  | C2 | W2 | S |
| D4 | M4 | W2 | M |
|  | C4 | W3 | S |

DATA DELETION PROCESSING

CACHE REGISTRATION PROCESSING FLOW

DISTRIBUTED PROCESSING SYSTEM, TASK PROCESSING METHOD, AND STORAGE MEDIUM

TECHNICAL FIELD

The present invention relates to a distributed processing system, a task processing method, and a storage medium.

BACKGROUND ART

For the purpose of improving a performance in a system which analyzes a large amount of data, there has been known a distributed processing environment considered data placement, which realizes an improvement in processing performance by distributed processing, an improvement in an I/O performance in which data is placed on a server DRAM memory, and a server in which data to be processed is placed is subjected to job scheduling.

In data replication processing of such a distributed processing environment, there has been known a technique of shortening a failure recovery time by notifying a job scheduler of a location destination of replicated data when a failure occurs. (Patent Literature 1)

CITATION LIST

Patent Literature

Patent Literature 1: Japanese Patent Application Publication No. 2012-073975

SUMMARY OF INVENTION

Technical Problem

However, according to the technique disclosed in Patent Literature 1, notification processing to a job scheduler occurs every time data replication processing associated with data update occurs, and a load concentration on the job scheduler, performance deterioration in a steady state caused by update of data placement information, and a time lag in synchronization processing occur.

An object of the present invention is to restore performance in a short time when a failure occurs while maintaining the performance in a steady state.

Solution to Problem

A typical distributed processing system of the present invention is directed to a distributed processing system having a plurality of worker nodes each having a set worker node identifier and each having a memory for caching data, the distributed processing system including: a first worker node in the plurality of worker nodes, which has a first worker node identifier set in the worker node identifiers, caches first output data that is an execution result of a first task in a first memory provided in a subject worker node according to a cache request, and copies the first output data onto another worker node; a second worker node in the plurality of worker nodes, which has a second worker node identifier set in the worker node identifiers, and caches a copy of the first output data in a second memory provided in the subject worker node; and a master node that has information on the first worker node identifier, and selects the first worker node based on the information on the first worker node identifier if a worker node to which a second task that receives the first output data is allocated is the first worker node.

Advantageous Effects of Invention

According to the present invention, the performance in the steady state can be maintained, and the performance can be restored in a short time when a failure occurs. Further, the restoration time can be set within a predetermined time regardless of a data size and a task execution time.

BRIEF DESCRIPTION OF DRAWINGS

FIG. 4 A diagram illustrating an example of a task management table.

FIG. 5 A diagram illustrating an example of a task placement management table.

FIG. 6 A diagram illustrating an example of a cache management table.

FIG. 7 A diagram illustrating an example of a local task management table.

FIG. 8 A diagram illustrating an example of a local cache management table.

FIG. 9 A diagram illustrating an example of a copy data management table.

DESCRIPTION OF EMBODIMENTS

Hereinafter, embodiments will be described with reference to the drawings. In the following description, information may be described by expressions such as "XXX table", but those pieces of information may be represented by a data structure other than a table data structure. For that reason, in order to show that the information does not depend on the data structure, "XXX table" and so on may be referred to as "XXX information" in some cases. When describing the contents of each piece of information, identification information of expressions "number" and "name" is adopted, but other types of identification information may be used. "XXX processing" or "XXX unit" in the following description may be "XXX program". The description with the subject of "processing" or "unit" in the following description may be a description with a processor as the subject. Part or all of the processing of the processor may be realized by dedicated hardware. Various programs may be installed in each computer by a program distribution server or a computer readable storage medium.

First Embodiment

Figure 1:
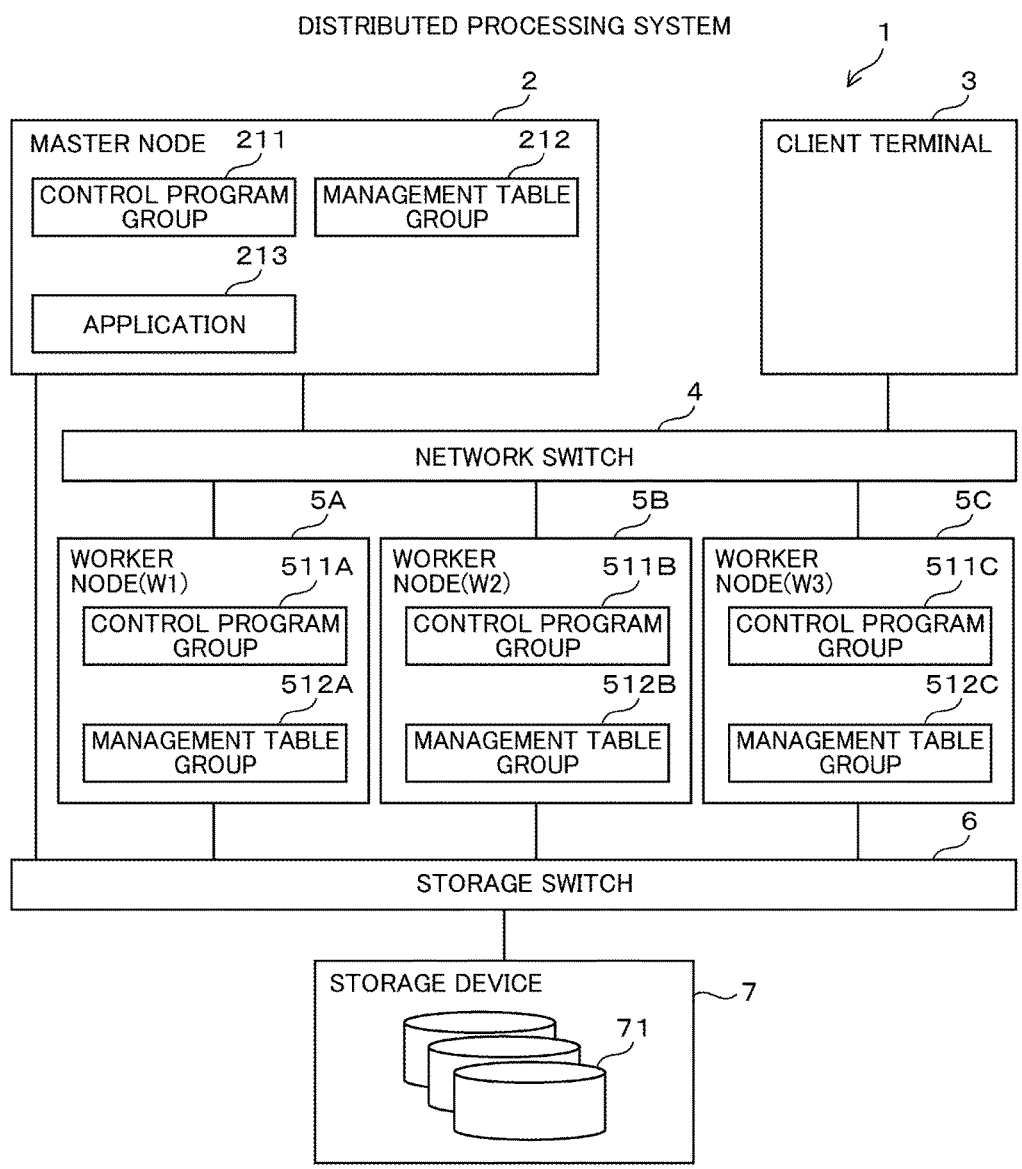
FIG. 1 A diagram illustrating an example of a configuration of a distributed processing system.

FIG. 1 is a diagram illustrating an example of a configuration of a distributed processing system. The distributed processing system may be a computer system 1 installed in a data center as a whole. In the computer system 1, a master node 2 and a client terminal 3 are connected through a network switch 4 to a plurality of worker nodes 5A, 5B, and 5C (hereafter, when there is no necessary to particularly distinguish the worker nodes 5A, 5B, and 5C from each other, those worker nodes 5A, 5B, and 5C are referred to typically as "worker nodes 5", and the other reference numerals are also denoted by the same symbols), and the master node 2 and the worker nodes 5 are connected to a storage device 7 through a storage switch 6.

The master node 2 is configured by a personal computer, a workstation or the like, and has a control program group 211, a management table group 212, and an application 213. Specifically, as shown in an example of FIG. 2, the master node 2 includes a memory 21, a CPU (Central Processing Unit) 22, a network interface 23, and a disk interface 24, and operates under the control of, for example, an OS (Operating System).

The CPU 22 is a CPU that controls the operation of the entire master node 2, and executes necessary processing based on a control program group 211 and a management table group 212, which will be described later, stored in the memory 21. The memory 21 is used not only for storing the respective contents in the control program group 211 and the management table group 212, which will be described later, but also used as a work memory for the CPU 22.

The network interface 23 is a communication interface compatible with the network switch 4 shown in FIG. 1, and performs protocol control when the master node 2 communicates with each worker node 5. The disk interface 24 is a communication interface compatible with the storage switch 6, and performs protocol control when the master node 2 communicates with the storage device 7.

Returning to FIG. 1, as with the master node 2, the worker nodes 5 are each configured by a personal computer, a workstation, or the like. The worker node 5A is identified by "W1" and has a control program group 511A and a management table group 512A. The worker node 5B is identified by "W2", and has a control program group 511B and a management table group 512B. The worker node 5C is identified by "W3", and has a control program group 511C and a management table group 512C.

Each of the control program groups 511A, 511B, and 511C is a program group having the same contents, except that the stored worker nodes 5 are different. Each of the management table groups 512A, 512B, and 512C is different in the stored worker nodes 5 from each other, and has a table group of the same items, and the contents of each item may be different or may be the same.

Figure 3:
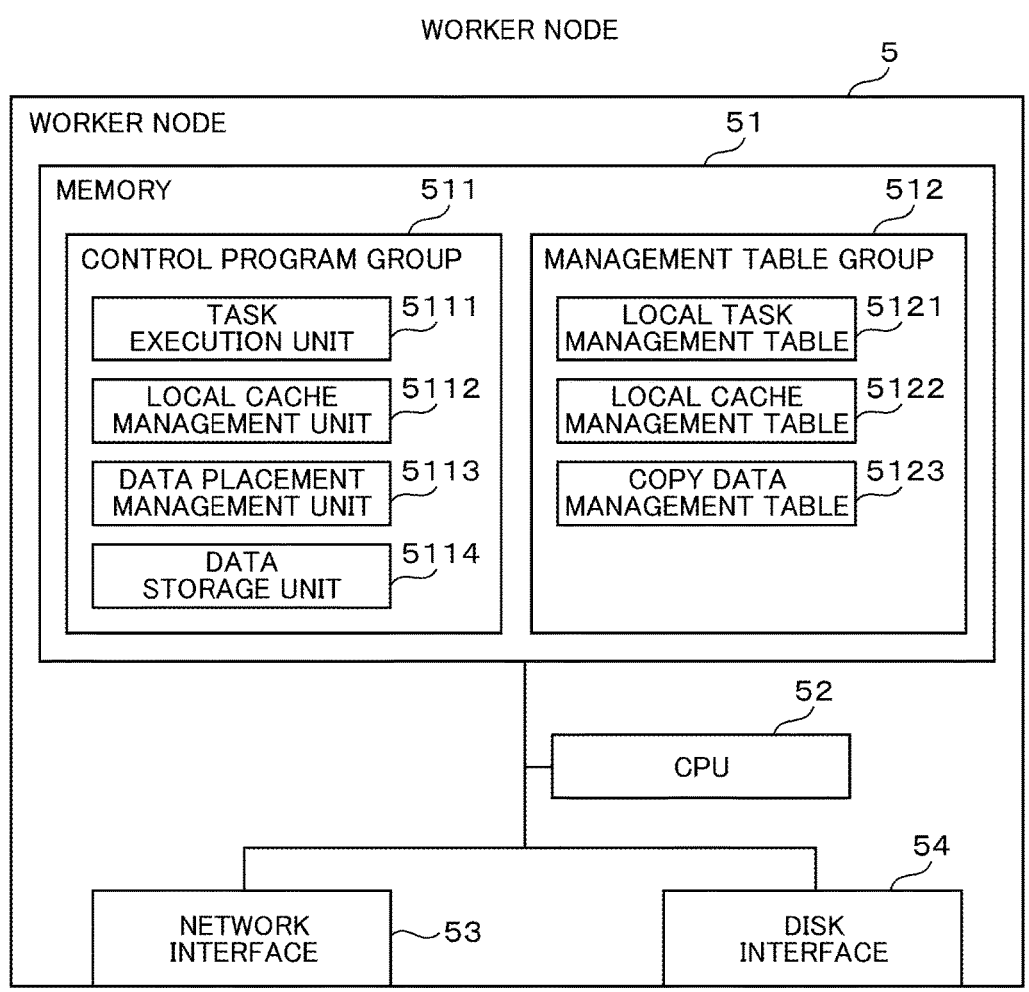
FIG. 3 A diagram illustrating an example of a configuration of a worker node.

As shown in FIG. 3, each of the worker nodes 5 includes a CPU 52, a memory 51, a network interface 53, and a disk interface 54, and operates under the control of the OS, for example. Since those components are similar to the CPU 22, the memory 21, the network interface 23, and the disk interface 24 in the master node 2, their detailed description will be omitted. It should be noted that the memory 51 may be used for a cache to be described later, and the details of the control program group 511 and the management table group 512 in each of the worker nodes 5 will be described later.

Returning to FIG. 1, the storage device 7 includes a plurality of disk devices 71. The storage device 7 may form a RAID (Redundant Arrays of Inexpensive Disks) group using a plurality of disk devices 71. The storage device 7 may form a plurality of volumes on the RAID group. The plurality of disk devices 71 may be disk devices different in storage medium, for example, an HDD (Hard Disk Drive) and an SSD (Solid State Drive).

The disk device is, for example, an FC (Fibre Channel) disk, a SCSI (Small Computer System Interface) disk, a SATA (Serial ATA) disk, an ATA (AT Attachment) disk, a SAS (Serial Attached SCSI) disk, or the like, and is a storage medium capable of storing large capacity data.

Figure 2:
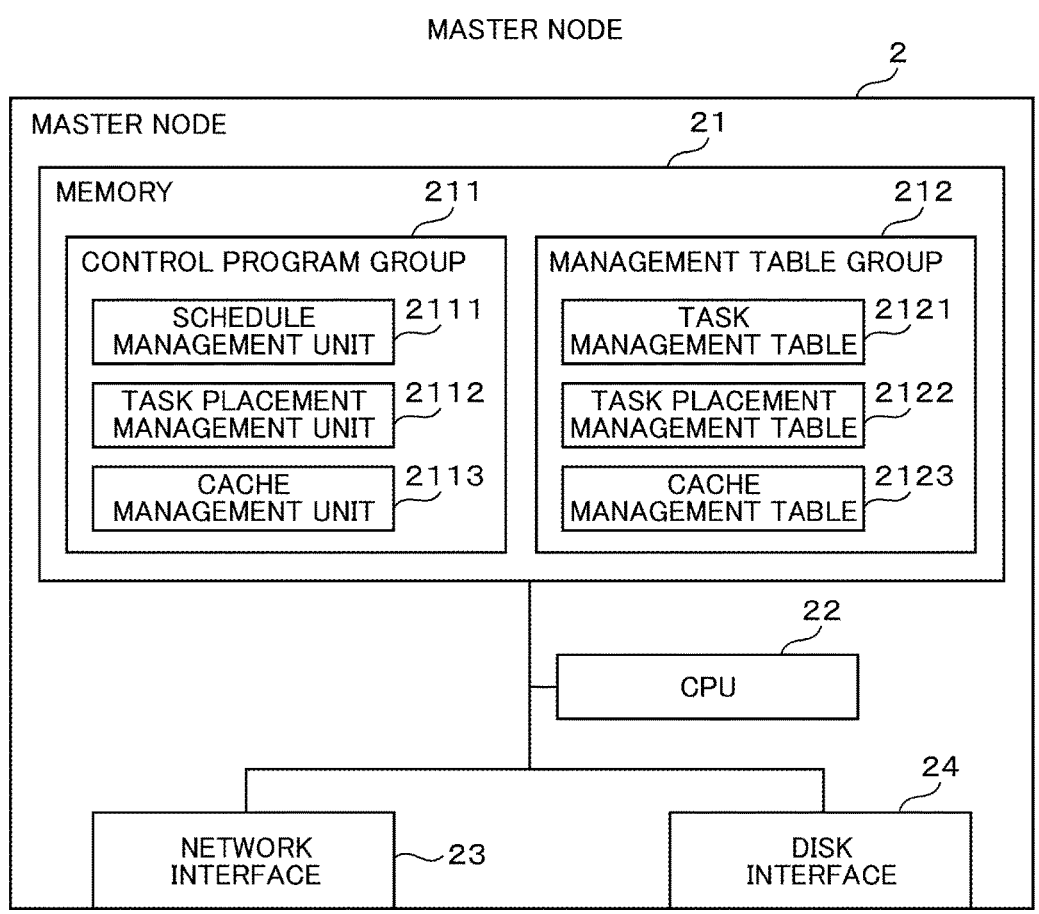
FIG. 2 A diagram illustrating an example of a configuration of a master node.

As shown in FIG. 2, the master node 2 includes a schedule management unit 2111, a task placement management unit 2112, and a cache management unit 2113 as a control program group 211 in the memory 21. Each of those units is a program and is divided for ease of description, but may be realized collectively or may be arbitrarily divided for convenience of implementation.

The schedule management unit 2111 manages a progress of each task with the use of the task management table 2121 in response to a processing request from the application 213. The task placement management unit 2112 manages task placement to each worker node 5 with the use of the task placement management table 2122 in response to a processing request from the schedule management unit 2112 or the task execution unit 5111.

The cache management unit 2113 manages the placement of the cache data for each worker node 5 with the use of the cache management table 2123 in response to the processing request from the schedule management unit 2111 or the data placement management unit 5113.

As illustrated in FIG. 3, the worker node 5 includes a task execution unit 5111, a local cache management unit 5112, a data placement management unit 5113, and a data storage unit 5114 as a control program group 511 in the memory 51. Each of those units is a program and is divided for ease of description, but may be realized collectively or may be arbitrarily divided for convenience of implementation.

The task execution unit 5111 manages the execution and progress of each task assigned with the use of the local task management table 5121 in response to the processing request from the task placement management unit 2112. The local cache management unit 5112 manages the allocated cache data with the use of the local cache management table 5122 in response to the processing request from the data placement management unit 5113 or the local cache management unit 5112 operating on another worker node 5.

The data placement management unit 5113 manages the consistency of task allocation information and cache data information between the master node 2 and each worker node 5 in response to a processing request from the task execution unit 5111 or the local cache management unit 5113. The data storage unit 5114 manages the memory 51 of the worker node 5 having the data storage unit 5114, and executes the placement of the cache data on the memory and the copy processing in cooperation with the data storage unit 5114 on another worker node 5 with the use of the copy data management table 5123.

Although each unit is described as the program of parts of the control program group 211 and 511, the program configuring each part may be executed by the CPUs 22 and 52 to configure each unit as an object. For example, the program that is the task execution unit 5111 may be executed by the CPU 52 to configure an object that is a task execution unit.

As shown in FIG. 4, the task management table 2121 includes a task identifier column 21211, a processing column 21212, an input data column 21213, an output data column 21214, a cache request column 21215, a state column 21216, and a priority column 21217. For example, the information of those columns indicates that a first task T1 is a task for converting a file 1 placed on the storage device 7 into a data object D1 handled by the application 213 by load processing, the processing has already been completed, and a priority is higher than that of other tasks.

In an example of FIG. 4, since the task is executed from above the task management table 2121, the data object of the output data column 21214 is the data object on a next row of the input data column 21213. The cache request column 21215 is information indicating whether or not to store the data object in the output data column 21214 in the cache, and is set in advance. The status column 21216 is information indicating the state of the task, and its contents will be described later.

As shown in FIG. 5, the task placement management table 2122 has a task identifier column 21221 and a worker node identifier column 21213. The task identifier column 21221 is information corresponding to the information in the task identifier column 21211 of the task management table 2121. The worker node identifier column 21222 is information for identifying the worker node 5 to which the task is allocated. For that reason, for example, the worker node identifier column 21222 represents that the first task T1 is being processed at the worker node W2.

As shown in FIG. 6, the cache management table 2123 has a data identifier column 21231 and a worker node identifier column 21232. The data identifier column 21231 is information corresponding to the data objects of the input data column 21213 and the output data column 21214 of the task management table 2121. The worker node identifier 21232 is information for identifying the worker node 5 in which the data object is placed in the cache. For that reason, for example, the worker node identifier 21232 represents that the first data object D1 is placed on the worker node W2.

As shown in FIG. 7, the local task management table 5121 has a task identifier column 51211, a processing column 51212, an input data column 51213, an output data column 51214, a cache request column 51215, a state column 51216, and a priority column 51217. Since each of those pieces of information is the same as each column of the task management information table 2121, its detailed description will be omitted.

As shown in FIG. 8, the local cache management table 5122 has a data identifier column 51221. The information represents, for example, that the data object D2 is cached in the local memory of the worker node 5 having the local cache management table 5122.

As shown in FIG. 9, the copy data management table 5123 has a data identifier column 51231, a copy data identifier 51232, a worker node identifier column 51233, and a state column 51234. The data identifier column 51231 is information corresponding to data objects such as an input data column 21213, an output data column 21214, and so on of the task management table 2121. The copy data identifier column 51232 is information for identifying each of a plurality of copies of the data object in the data identifier column 51231.

The worker node identifier column 51233 is information for identifying each worker node 5 in which each data object which is a copy of the copy data identifier column 51232 is located. The state column 51234 is attribute information indicating whether each data object as a copy of the copy data identifier column 51232 is a master (M) or a slave (S).

As a result, for example, the data storage unit 5114 manages the data objects D2 as the data objects M2 and C2 to which unique identifiers are attached, which are placed on the data objects M2 and C2. When the access request for the data object D2 is received with the data object M2 as the master (M) and the data object C2 as the slave (S), the data object M2 that is the master (M) is acquired from the worker node W1 and responds.

With the data management with the unique identifier added by the data storage unit 5114, the task execution processing and the data copy processing are processed, independently, and the data copy management processing can be hidden from the task execution processing, and the copy processing can be realized without affecting the task execution processing. The setting of the master (M) and the slave (S) will be described later.

Figure 10:
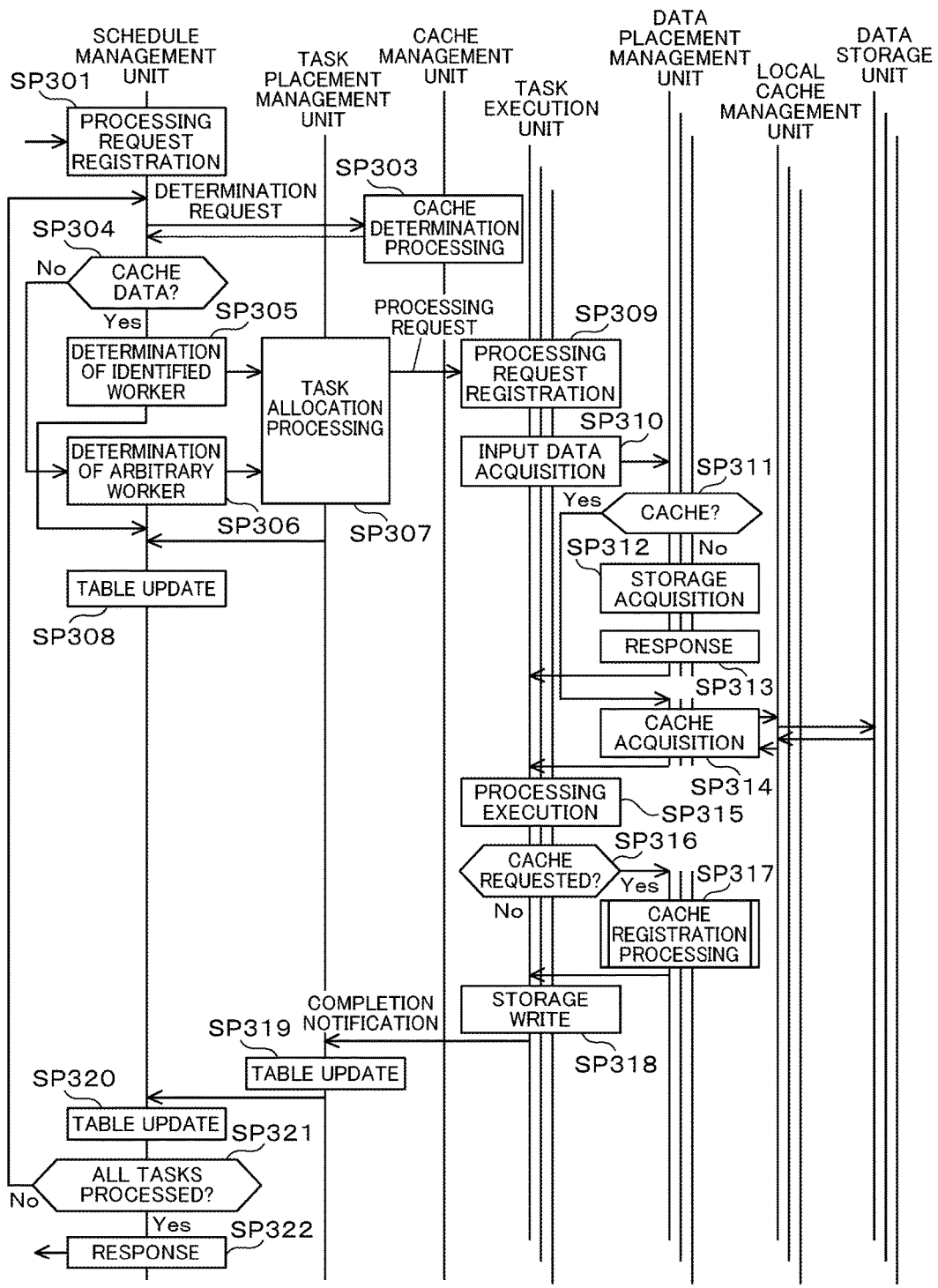
FIG. 10 A diagram illustrating an example of a process flow of task registration.

FIG. 10 is a diagram illustrating an example of a process flow of task registration. First, when receiving the task of the processing request from the application 213 or the task of the processing request through the OS, the schedule management unit 2111 registers the received task in the task management table 2121 (SP 301). At that time, the value in the state column 21216 is "unallocated".

The schedule management unit 2111 issues a cache determination request to the cache management unit 2113. The cache management unit 2113 that has received the request refers to the input data column 21213 of the task management table 2121 to return information on whether the data identifier of the identified input data is present on the data identifier column 21231 of the cache management table 2123 and the information of the corresponding worker node identification column 21232 if present (SP303).

The schedule management unit 2111 determines whether the input data has already been cached based on the response information (SP304). If the input data has already been cached in the determination in Step SP304, the schedule management unit 2111 identifies the worker node 5 in which the cache data is located based on the information in the worker node identifier column 21232 in the cache management table 2123.

Then, the schedule management unit 2111 issues a task allocation processing request to the identified worker node 5 to the task allocation management unit 2112, and updates the state column 21216 of the task management table 2121 to "allocated" (SP305).

On the other hand, if the input data has not been cached in the determination in Step SP304, the schedule management unit 2111 selects an arbitrary worker node 5 and issues a task allocation processing request to the task placement management unit 2112, and updates the state column 21216 of the task management table 2121 to the "allocated" (SP 306). When selecting the arbitrary worker node 5, the following selection may be performed.

Select at random
Select by round robin
Select worker node 5 with low load preferentially Select so that a plurality of tasks requiring the same input data are placed on one worker node 5.

If one worker node 5 cannot be determined in one selection, the worker node 5 may be selected based on a combination with another selection.

Next, the task placement management unit 2112 that has received the processing request issues a task processing request to the task execution unit 5111 on the worker node 5 designated by the processing request (SP307), and then transmits a response to the processing request to the schedule management unit 2111. The schedule management unit 2111 that has received the response adds a new line to the task placement management table 2122, registers the task that has issued the task processing request and the worker node 5 of the request destination, and updates the state column 21216 of the task management table 2121 to "processing" (SP308).

On the other hand, upon receiving the task processing request from the task placement management unit 2112, the task execution unit 5111 registers the contents of the task processing request in the local task management table 5121 (SP309). Next, the task execution unit 5111 selects one task from the local task management table 5121, and issues a request for acquiring the input data of the input data column 51213 of the selected task to the data placement management unit 5113 (SP310).

Upon receiving the request for acquiring the input data, the data placement management unit 5113 refers to the local cache management table 5122 through the local cache management unit 5112, and determines whether the designated input data has been cached (SP311). If the designated input data has not been cached in the determination in Step SP311, after having acquired the appropriate data from the storage device 7 (SP312), the data placement management unit 5113 responds to the task execution unit 5111 (SP313).

At this time, if the data acquired from the storage device 7 is the cache requested data with reference to the task management table 2121, the data placement management unit 5111 may perform cache registration processing to be described later.

If the input data has been cached, the data placement management unit 5113 acquires the cache data through the local cache management unit 5112 and the data storage unit 5114, and responds to the task execution unit 5111 (SP314). Upon receiving the response, the task executing unit 5111 determines whether the cache request of the processing result is present with reference to the cache request column 51215 of the local task management table 5121 (SP316) after having executed the task registered in Step SP309 with the use of the input data included in the response (SP315).

If there is no cache request in the determination of Step SP316, the task execution unit 5111 advances to Step SP318 without registering the task in the cache, and if there is a cache request, the task execution unit 5111 issues a cache request to the data placement management unit 5113 in the same worker node 5.

Upon receiving the request, the data placement management unit 5113 performs cache registration processing (described later) and responds to the task execution unit 5111 (SP317). Upon receiving the response, the task execution unit 5111 stores the output data of the processing result of the task in the storage device 7, and then returns the execution result to the task placement management unit 2112 of the master node 2 (SP318).

Next, the master node 2 returns the execution result to the schedule management unit 2111 after having deleted the row of the appropriate task from the task placement management table 2122 based on the execution result of the task execution processing received from the worker node 5 (SP319). Upon receiving the response, the schedule management unit 2111 updates the item of the task that has received the result in the status column 21216 of the task management table 2121 to "processed" (SP320).

As a result, it is determined whether processing of all tasks has been completed, that is, whether all the values in the status column 21216 of the task management table 2121 are "processed" (SP321). If it is determined in Step SP321 that all of the tasks are "processed", the schedule management unit 211 completes the task registration processing, and responds to the application 213 or OS that has requested for processing (SP322). If there is a task that is not "processed", the process returns to immediately after Step SP 301.

Figure 11:
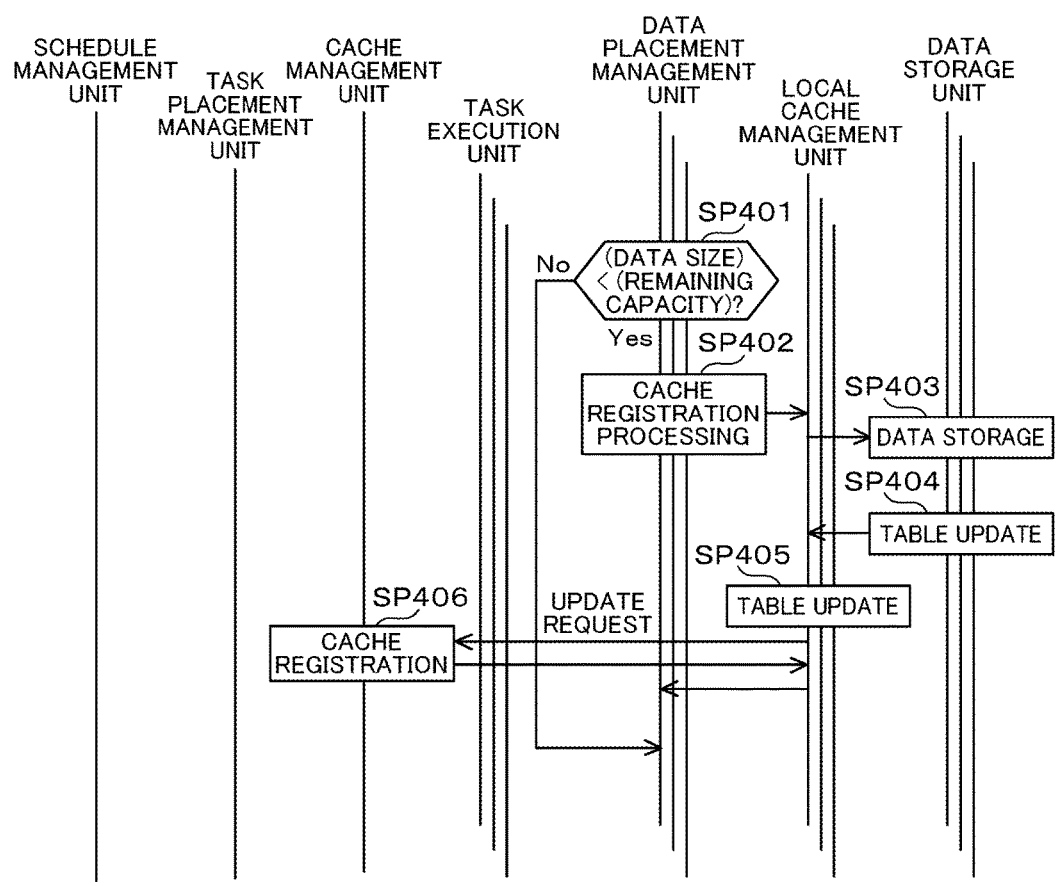
FIG. 11 A diagram illustrating an example of a process flow of cache registration.

FIG. 11 is a diagram showing an example of a process flow of cache registration. This processing is a processing procedure of the cache registration processing SP317 in FIG. 10. First, the data placement management unit 5113 determines whether the size of the data designated as the cache request exceeds the remaining capacity of the cache memory such as the memory 51 (SP401).

The data placement management unit 5113 completes the cache registration processing if the cache request exceeds the remaining capacity in the determination of step SP 401, and the data placement management unit 5113 issues a request for storing the data to the data storage unit 5114 in the same worker node through the local cache management unit 5112 if the cache request is less than or equal to the remaining capacity (SP402).

Upon receiving the data storage request, the data storage unit 5114 stores the data to be cached in a memory space managed by itself, selects another worker node 5, and caches the copy data (SP403). After registering the information on the cached data and the copied data in the copy data management table 5123, the data storage unit 5114 issues a response including the data storage result to the local cache management unit 5112 (SP404).

Upon receiving the response, the local cache management unit 5112 registers the cache data in its own local cache management table 5122, and then issues a request for updating the cache information including the cached data and the identifier of the worker node 5 of the placement destination to the cache management unit 2113 of the master node 2 (SP405).

Upon receiving the information update request, the cache management unit 2113 registers the data designated in the information update request and the information of the worker node 5 in the cache management table 2123, responds through the local cache management unit 5113 to the data placement management unit 5113, and thereafter completes the cache registration processing (SP406).

At this time, the data to be registered in the cache is only the master data, that is, the information on the data with the state column 51234 of "M" in the copy data management table 5123, and the copy data, that is, information on the data in which the state column 51234 of the copy data management table 5123 is "S" is not notified.

As described above, the management of the copy data is executed by the worker node 5, and concealed from the master node 2, there being capable of reducing a load on the master node 2.

When selecting the worker node 5 where the copy data is to be located, the following selection may be made. In the case where a predetermined number of worker nodes 5 cannot be determined in one selection, the worker nodes 5 may be selected based on a combination with other selections.

Select by consistent hashing method
Select by round robin
Select at random
Select worker node 5 with the lower memory capacity utilization rate preferentially.

Further, the cache registration processing is immediately completed if the cache request exceeds the capacity in determination in step SP401. However, among the data cached at the time of execution of Step SP401, data low in a reference frequency selected based on criteria such as an LRU (Least Recently Used) and data to be newly cached may be replaced with each other.

Figure 12:
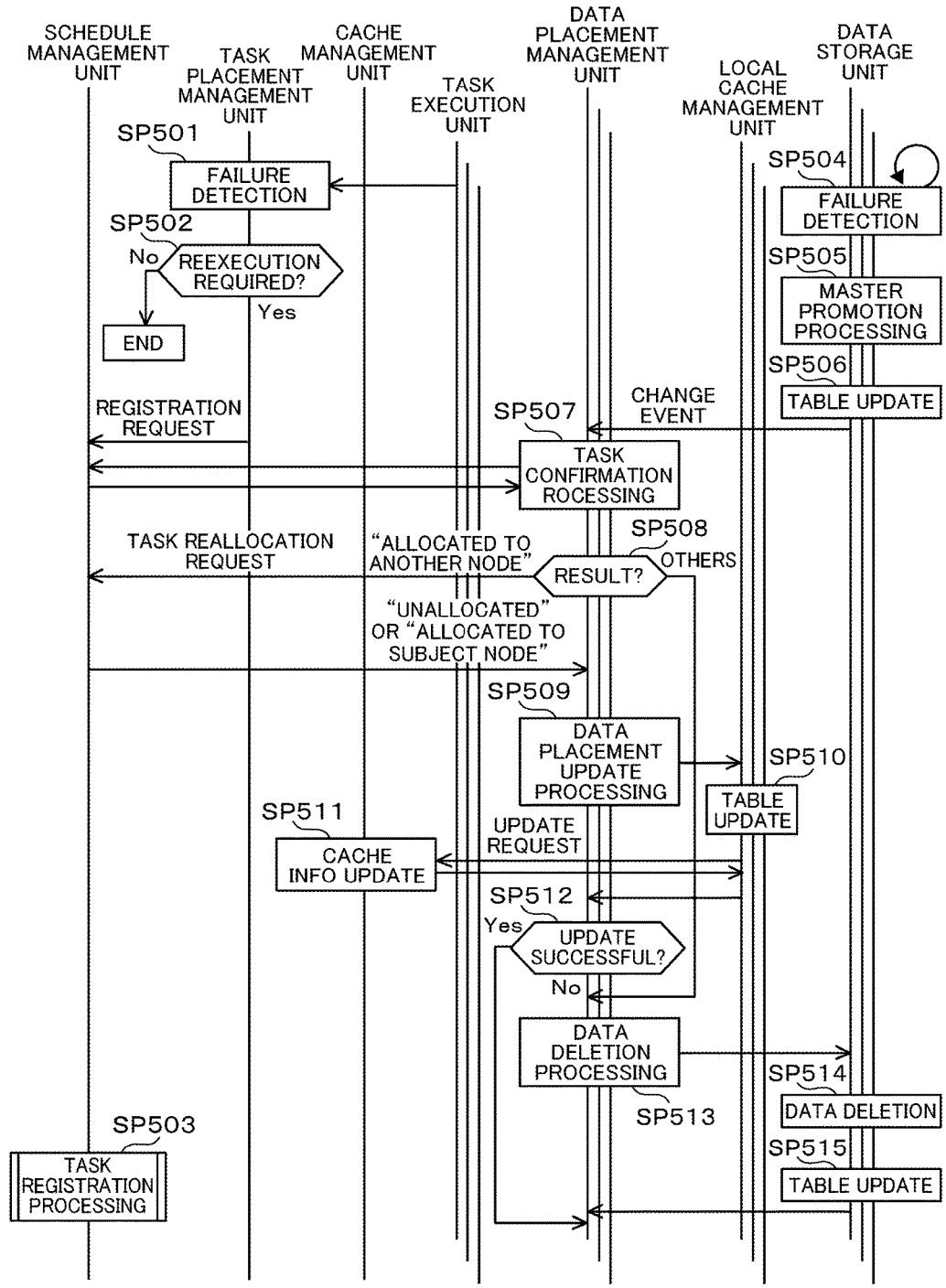
FIG. 12 A diagram illustrating an example of a process flow of a failure task restoration.

FIG. 12 is a diagram showing a process flow of a failure task restoration. First, the task placement management unit 2112 detects a failed worker node 5 with the use of means such as a heartbeat for the task execution unit 5111 (SP501). Then, the task placement management unit 2112 refers to the task management table 2121 and the cache management table 2123 to identify the task being executed and the data being cached on the worker node 5 where the failure has occurs, and determines whether the task required to be reexecuted is present (SP502).

If there is no task required to be reexecuted in the determination of Step SP502, the task placement management unit 2112 completes the failure task restoration processing, and if there is the task required to be reexecuted, the task allocation management unit 2112 issues a request for reexecution of the task registration processing described with reference to FIG. 10 to the schedule management unit 2111 (SP503).

On the other hand, the data storage unit 5114 detects the worker node 5 in which a failure has occurred with the use of means such as a heartbeat between the worker nodes 5 (SP504), refers to the copy data management table 5123, promotes one of the copy data of the data placed on the worker node 5 where the failure has occurred as the master (SP505), and updates the copy data management table 5123 (SP506).

Then, the data storage unit 5114 issues an event notifying a data placement change to the data placement management unit 5113 being executed on the worker node 5 where the master-promoted data is placed (SP506). The heartbeat signal used by the task placement management unit 2112 and the heartbeat signal used between the worker nodes 5 may be the same as or different from each other.

The worker node 5 to be promoted as the master may be set in advance, or a rule for promotion may be preset and the worker node 5 may be promoted according to the rule. In particular, when there is only one copy data, the copy data may be set as a slave, and the worker node 5 having the copy data may be promoted to the master.

Further, in SP505 of the master promotion processing, data lost due to a failure is restored at once. Alternatively, an inquiry to the schedule management unit 2111 of the master node 2 may be made to confirm the priority of the task for inputting the lost data with reference to the input data column 21213 and the priority column 21217 in the task management table 2121, and the task may be sequentially promoted to the master from the data of the task higher in the priority.

Next, the data placement management unit 5113 collects the task placement information from the schedule management unit 2111 (SP507), and determines whether the task using the master-promoted data has already been allocated to another worker node 5 (SP508). If the determination result is "other", that is, "processed" or "under processing" in the determination in Step SP508, the process proceeds to Step SP513.

If the determination result is "allocated to another node" in the determination in Step SP508, the cache allocation management unit 5113 issues a request for reallocation of the appropriate task to the schedule management unit 2111 through the task allocation management unit 2112. Upon receiving the request, the schedule management unit 2111 responds to the task reallocation request for the data allocation management unit 5113, and then executes the task registration process described with reference to FIG. 10 (SP503).

Meanwhile, the data placement management unit 5113 that has received the response from the schedule management unit 2111 proceeds to Step SP509. Also, if the determination result is "unallocated" or "allocated to the subject node" in the determination of Step SP508, the schedule management unit 2111 issues a request for updating the data allocation including the master-promoted data to the local cache management unit 5112 as the data allocation update processing (SP509).

Upon receiving the update request, the local cache management unit 5112 registers the master-promoted data in the local cache management table 5122 managed by the local cache management unit 5112, and then issues, to the cache management unit 2113 of the master node 2, a request for updating the data placement including the master-promoted data and the identifier information on the worker node 5 in which the master-promoted data is allocated (SP510).

When receiving the request, the cache management unit 2113 refers to the data identifier column 21231 in the cache management table 2123, updates the information of the worker node identifier column 21232 of the data designated in the received request to the information of the received worker node 5, and thereafter returns the processing result to the data placement management unit 5113 through the local cache management unit 5112 (SP511).

Upon receiving the response, the data allocation management unit 5113 determines the success or failure of the data update processing based on the response contents (SP512). If the data update processing is successful in the determination of Step SP512, the data placement management unit 5113 completes the failure task restoration processing. If the data update processing is failed, the data placement management unit 5113 issues a request for data deletion processing to the data storage unit 5114 (SP513).

Upon receiving the request, the data storage unit 5114 deletes the data to be deleted and the copy data placed on another worker node 5 from the memory (SP514), updates the copy data management table 5123 based on the deleted contents, and thereafter responds to the data placement management unit 5113 (SP515), and completes the failure task restoration processing.

As described above, the task reexecution request (SP502) is executed prior to the master promotion processing (SP505) by determining whether the copy data can be used based on the result of the task confirmation processing (SP507), and the state changes to an "in process" state, and the cache data is generated on another worker node 5, to thereby prevent occurrence of a state in which a plurality of identical cache data are registered on the local cache management table 5122.

In other words, the inefficiency of the memory utilization caused by placing data other than the copy purpose on the plurality of worker nodes 5 is prevented, thereby being capable of realizing an improvement in the memory utilization efficiency.

Furthermore, in the case where the state has been shifted to the "allocated" state, the task reallocation request is issued, and wasteful cache data rebuilding processing is avoided, thereby being capable of shortening a restoration time.

Figure 13:
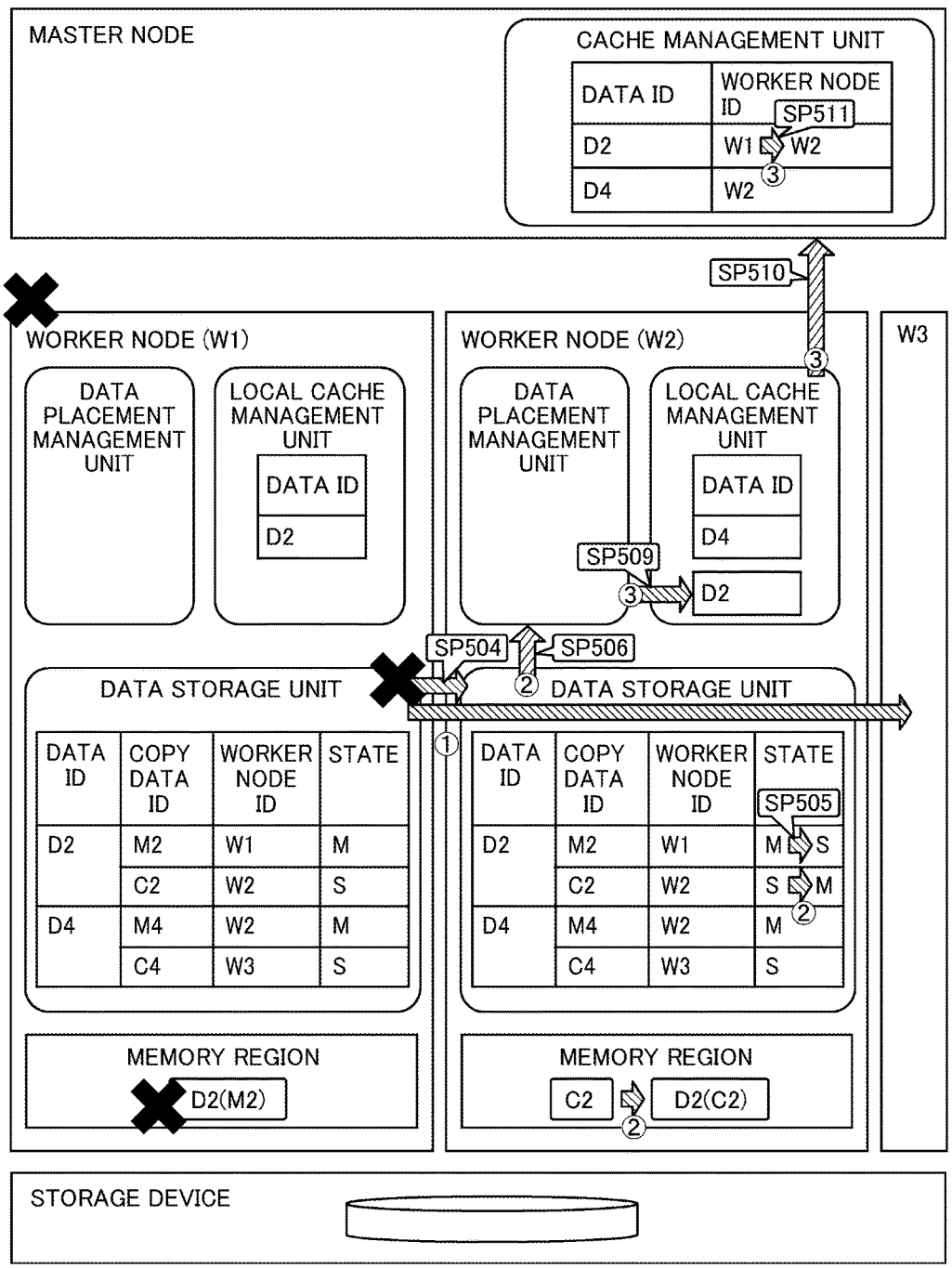
FIG. 13 A diagram illustrating an example of updating information of a data placement update process.

A specific example of the data placement update processing (SP504 to SP506, SP509 to SP511) of the cache management table 1213, the local cache management table 5122, and the copy data management table 5123 in the failure processing will be described with reference to FIG. 13. FIG. 13 shows an example of updating the data allocation information of the worker node 5 (W2, W3) and the master node 2 which have detected the failure occurring in the worker node 5 (W1).

(1) First, the worker node 5 (W2) that has detected the failure of the worker node 5 (W1) refers to the copy data management table 5123, and determines that data C2 held by itself is promoted as the master, and needs to be treated as data D2 because the data D2 (M2) held by the worker node 5(W1) disappears.

(2) The worker node 5(W2) that has determined that the master promotion processing is necessary, updates a value of M2 in the state column 51234 of the row of D2 in the copy data management table 5123, from the master (M) to the slave (S), a value of C2 from the slave (S) to the master (M), to thereby change the data C2 as being treated as master data of the data D2, and notifies the data placement management unit 5113 in the worker node 5(W2) of an event that the data placement has been changed.

Similarly, in the worker node 5 (W3) that has detected the occurrence of a failure in the worker node 5 (W1), the copy data management table 5123 is changed to detect that a data placement change occurs in the worker node 5 (W2). The update processing may be implemented at the timing of detecting the failure in the worker node 5 (W1) or may be implemented by receiving a master promotion event notification from the worker node 5 (W2) that has performed the master promotion processing.

In addition, the worker node 5 (W2) that has inherited the data of the worker node 5 (W1) due to the failure occurrence not only manages the data lost due to the failure but also manages the memory capacity itself. That is, when receiving the cache request of the new data D5, the memory area managed by the worker node 5 (W2) itself exceeds the capacity. In the case where the data can be stored in the area managed as the storage area of the copy data in the worker node 5(W1), the data storage processing in the storage area of the copy data is executed with the placement destination of M5 that is a copy data identifier of data D5 as the worker node 5(W1), with the placement destination of C5 that is a copy data identifier of data D5 as the worker node 5(W2), and a state of C5 as the master (M).

(3) The data allocation management unit 5113 of the worker node 5 (W2) that has received the data allocation change event notifies the local cache management unit 5112 that operates at the worker node 5(W2) similarly that the data D2 is newly placed in the worker node 5(W2) as the data placement update processing.

Upon receiving the notification, the local cache management unit 5112 adds the data D2 to the data identifier 51221 column of the local cache management table 5122, and notifies the cache management unit 2113 of the master node 2 of the result. Upon receiving the notification, the cache management unit 2113 updates the worker node identifier column 21222 of the data D2 in the cache management table 2123 to W2.

Based on a series of processing results described above, the master node 5 (W2) and all of the other worker nodes 5 can detect that the data D2 lost due to the failure of the worker node 5 (W1) is placed on the worker node 5 (W2).

Next, a specific example of data deletion processing (SP513 to SP515) in the case where the tasks are relocated (SP307 to SP311, SP401 to SP406) before the data placement update processing in the failure processing will be described.

Figure 14:
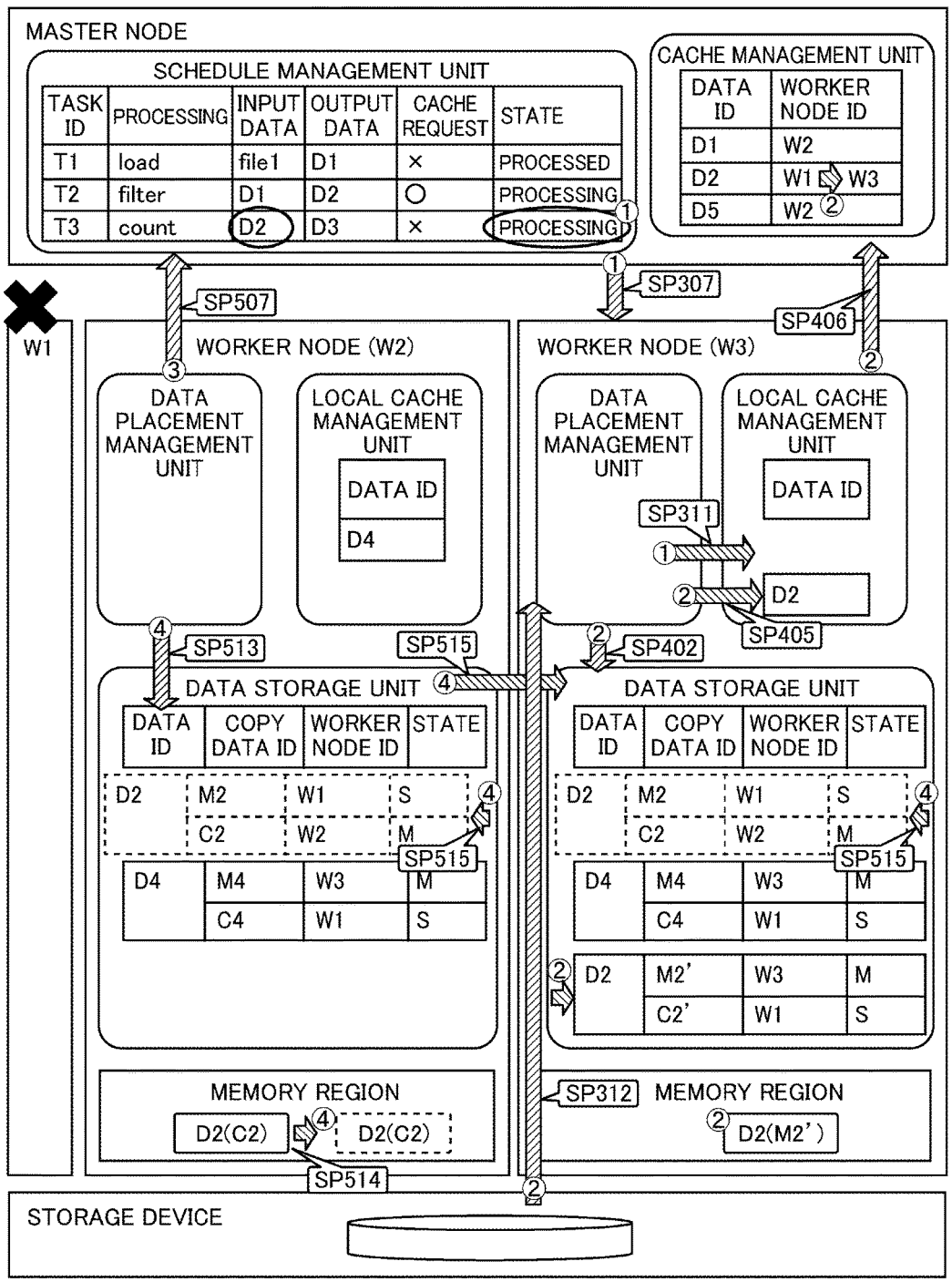
FIG. 14 A diagram illustrating an example of updating information of a data deletion process.

FIG. 14 shows an example of updating the data placement information of the worker nodes 5 (W2, W3) and the master node 2 in the case where the task T3 which receives data D2 starts the processing on another worker node 5 before the data placement update processing of data D2 due to a failure occurrence of worker node 5 (W1) illustrated in FIG. 13.

(1) First, the schedule management unit 2111 of the master node 2 issues a processing request of the task T3 to the worker node 5 (W3) through the task placement management unit 2112, and updates the state of the task T3 to "processing".

After having registered the task T3 in the local task management table 5121, the worker node 5 (W3) that has received the processing request of the task T3 refers to the input data column 51213 of the task T3, detects that the data D2 is necessary, and further refers to the local cache management table 5122, and detects that there is no data D2 in its own memory.

(2) Upon detecting that the input data D2 is not present on the memory, the data placement management unit 5113 acquires the data D2 from the storage device 7 and issues a request for registration of the data D2 to the data storage unit 5114. Upon receiving the request, the data storage unit 5114 newly registers the data D2, places the master data in the worker node 5 (W3), and places the copy data in the worker node 5 (W1). It should be noted that the placement destination of the copy data may be selected from the worker nodes 5 that normally operate except for the worker node 5 (W1) which is stopped due to the failure.

Upon confirming the completion of the data registration, the data placement management unit 5113 issues a cache registration request of the data D2 to the local cache management unit 5112, and the local cache management unit 5112 that has received the request adds the data D2 to the data identifier 51221 column of the local cache management table 5122, and notifies the cache management unit 2113 of the master node 2 of the addition result. Upon receiving the notification, the cache management unit 2113 updates the worker node identifier column 21232 of the data D2 in the cache management table 2123 to W3.

In this state, when the master promotion in the data placement update processing shown in FIG. 13 is completed, there are two master data of the data D2 as the worker nodes 5 (W2, W3). However, since only one worker node 5 can be registered in the worker node identifier column 21232 column of the cache management table 2123 in the master node 2, one of those master data becomes unused data. Therefore, in order not to interrupt the task T3 being processed, the data D2 placed on the worker node 5 (W2) is deleted.

(3) When referring to the task management table 2121 of the master node in the task confirmation processing in the data placement update processing being processed at the worker node 5 (W2), it can be determined that the task T3 which receives the master-promoted data D2 is being processed, in other words, the data D2 has already been placed on another worker node 5.

(4) Accordingly, as a data deletion process of the master-promoted data D2, the data placement management unit 5113 issues a request for deletion of the data D2 to the data storage unit 5114. Receiving the request, the data storage unit 5114 refers to the worker node identifier column 51233 and the state column 51234 of the copy data management table 5123, identifies that itself, that is, the worker node 5 (W2) manages the data C2 as D2 being the master, deletes the data C2 from the memory, and thereafter issues a request for deletion of the copy data related to D2 to the other worker nodes 5.

Based on a series of processing results described above, even when the tasks are relocated before the data placement update processing in the failure processing, unnecessary data is deleted, and the memory area can be efficiently used while the consistency of the data placement information of the master node 2 and each worker node 5 is kept.

Figure 15:
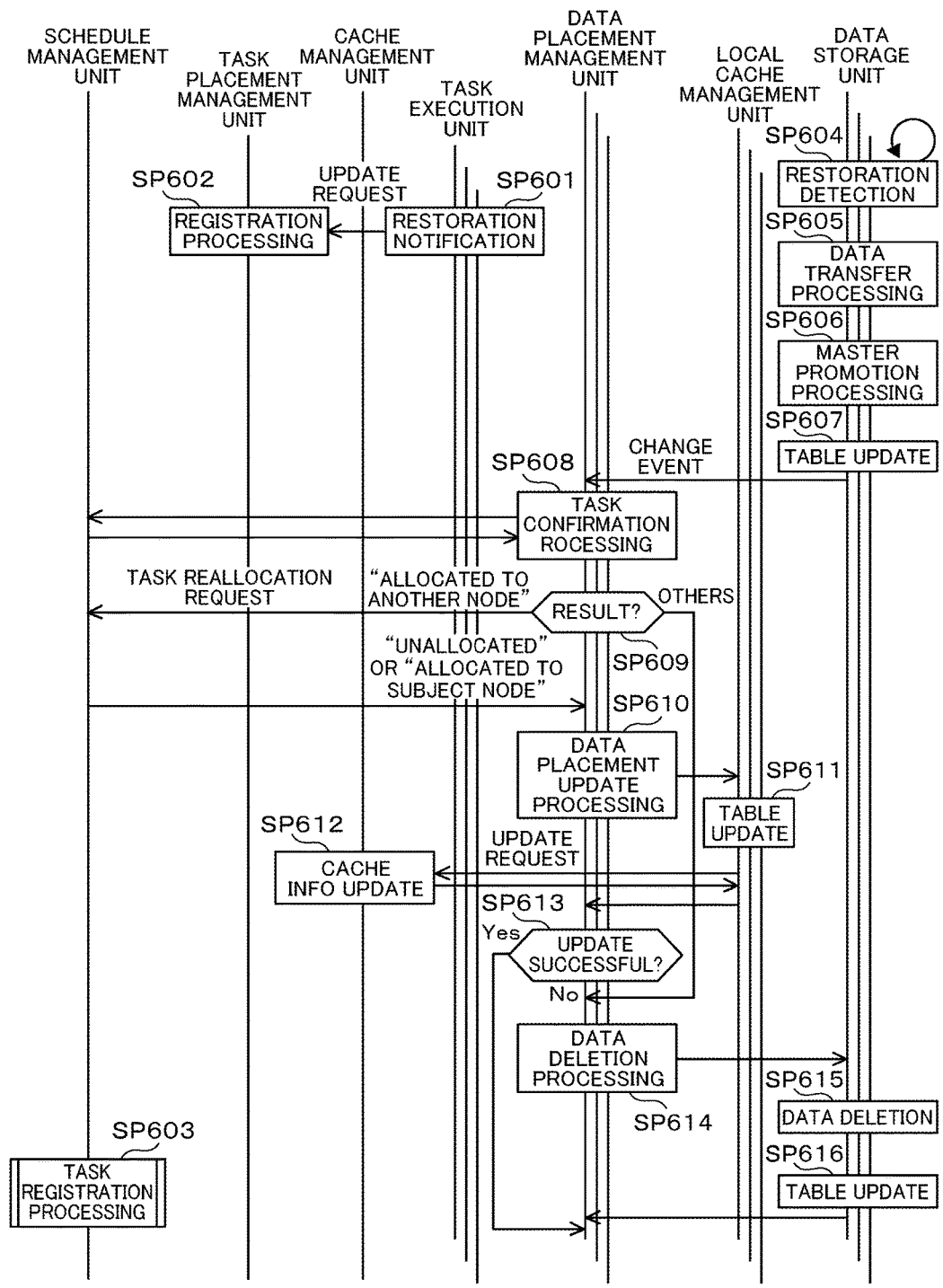
FIG. 15 A diagram illustrating an example of a process flow of worker node restoration.

FIG. 15 is a diagram showing an example of a process flow of the worker node restoration. First, the task execution unit 5111 operating on the restored worker node 5 issues a restoration notification to the task placement management unit 2112 at the time of activation (SP601), and the task placement management unit 2112 which has received the notification registers the restored worker node 5 as a management target of itself (SP602).

Further, the data storage unit 5114 operating on the restored worker node 5 issues a recovery notification to the data storage unit 5114 operating on another worker node 5, and the data storage unit 5114 of another worker node 5 detects the restoration (SP604). The data storage unit 5114 of the restored worker node 5 performs data transfer processing of collecting the cache data which has been in charge of itself before the failure occurs from another worker node 5 (SP605).

With the returning to the data placement before occurrence of a failure in the data transfer processing, the memory utilization amounts of the worker nodes 5 including the restored worker node 5 can be quickly equalized. Meanwhile, if the cache data that has been in charge is placed on the storage device 7, the cache data may be acquired from the storage device 7.

Next, the processing in steps SP606 to SP616 is executed, and since the respective processing are the same processing as the processing in Steps SP505 to SP515 in FIG. 12, a detailed description of the same processing will be omitted.

As described above, the management of copy data is offloaded to the local cache management unit 5112 of the worker node 5 to reduce the load on the master node 2. As a result, while the response performance of the application 213 in the steady state is maintained, the placement of the copy data is notified the cache management unit 2113 of the master node 2 at the time of the failure occurrence in the worker node 5, and the cache data is taken over, thereby being capable of preventing the system stop and the performance deterioration at the time of the failure occurrence.

Also, a restoration time from the failure includes a failure detection time (SP504), a system switchover processing time (SP505 and SP506), an event notification time (SP509 to SP511), and the like. In this example, the failure detection time is a time required for the data storage unit 5114 to detect the worker nodes 5 in which the failure has occurred in the SP 504. The failure detection time is varied depending on a set value such as a monitoring cycle, but kept to a constant value after the system has operated. On the other hand, the system switchover processing time required for executing the SP505 and the SP506, the event notification time required for executing the SP509 to SP511, and the time required for executing other processing for data restoration are sufficiently small values as compared with the failure detection time (SP504). Therefore, the restoration time is a failure detection time which is kept constant mainly after the system has operated.

In general, when rebuilding data at the time of failure, since the data lost due to the failure is recalculated or reacquired from the disk device, the data rebuilding time is varied depending on a time (task execution time) for reexecuting the task and a data size, which has caused the restoration time to increase. On the other hand, in the present embodiment, since the copy data is placed in the other worker nodes 5 in SP403 of the cache registration processing in FIG. 11, in the failure task restoration processing of FIG. 12, an event notification of the data placement update (SP509 to SP511) may be executed, and data reconstruction time can be reduced. The restoration time according to the present embodiment does not depend on the data size and the task execution time, and becomes mainly a failure detection time that is kept constant after the system has operated, and therefore can fall within a predetermined time.

Second Embodiment

A second embodiment is different from the first embodiment in that a data storage unit 5114 and a copy data management table 5123 in a worker node 5 are included in a device other than the worker nodes 5, and the device is disposed between the worker nodes 5 and a storage device 7 (storage switch 6). In the following description of the second embodiment, the same configuration and the same processing as those in the first embodiment are denoted by the same reference numerals, and a description of the same configuration and processing will be omitted, and features different from those of the first embodiment will be described.

Figure 16:
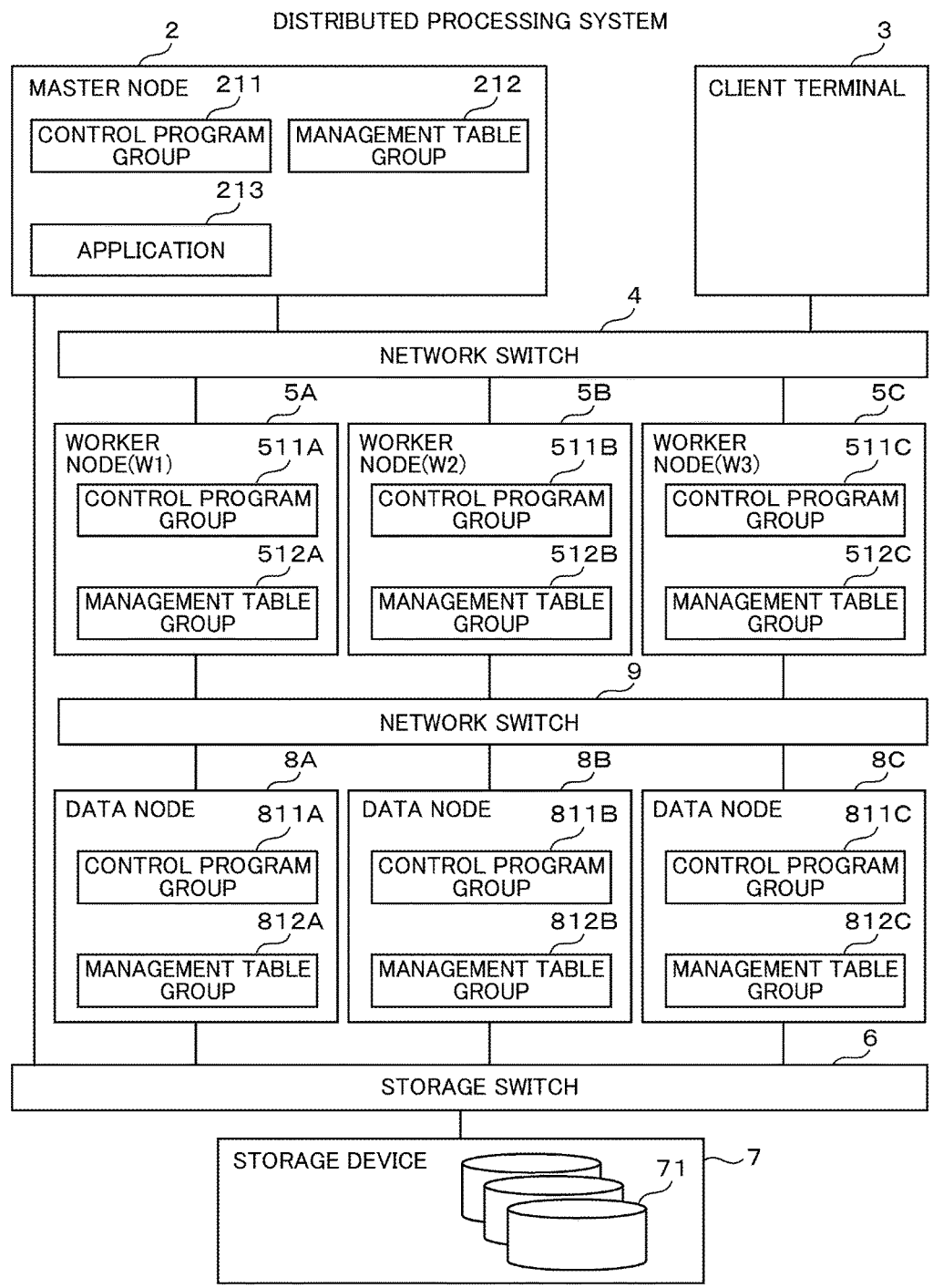
FIG. 16 A diagram illustrating an example of a configuration of a distributed processing system according to a second embodiment.
Figure 17:
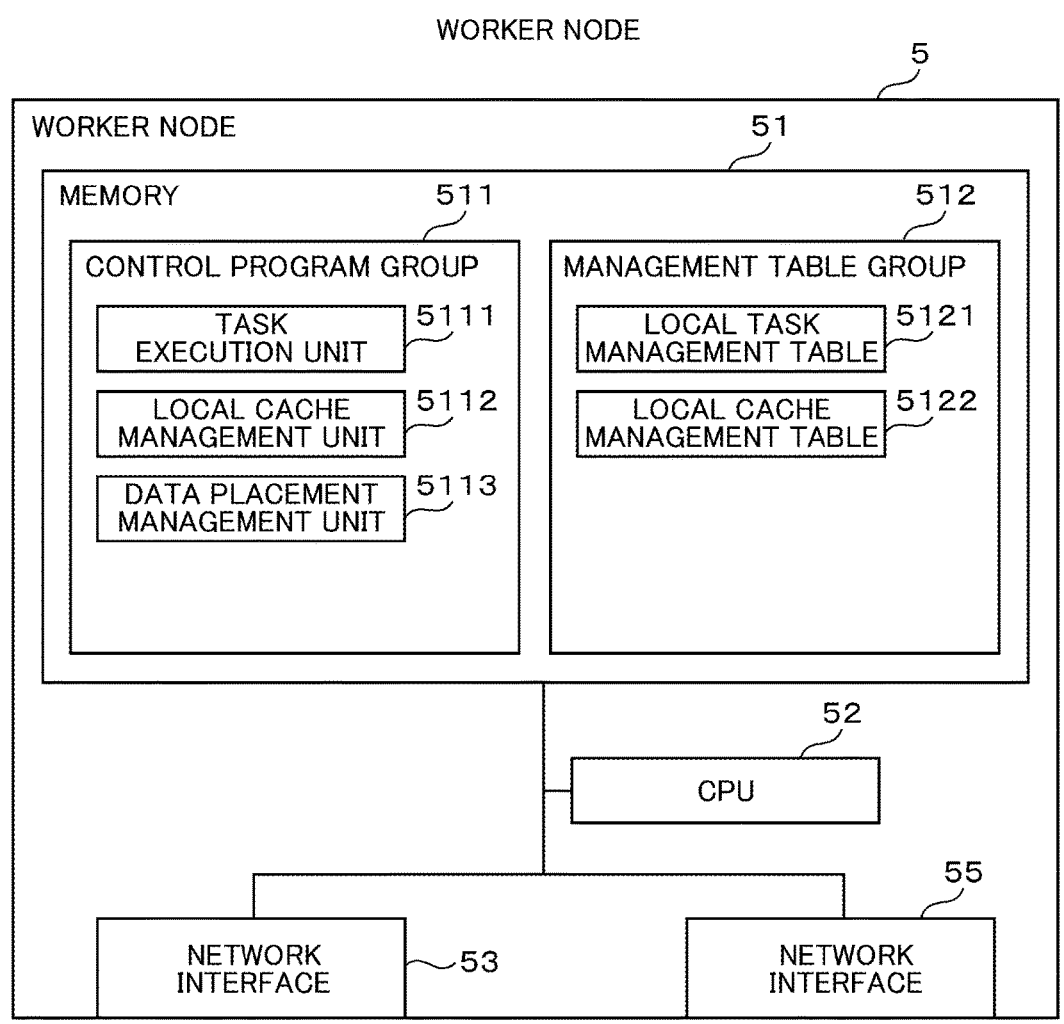
FIG. 17 A diagram illustrating an example of a configuration of a worker node according to the second embodiment.
Figure 18:
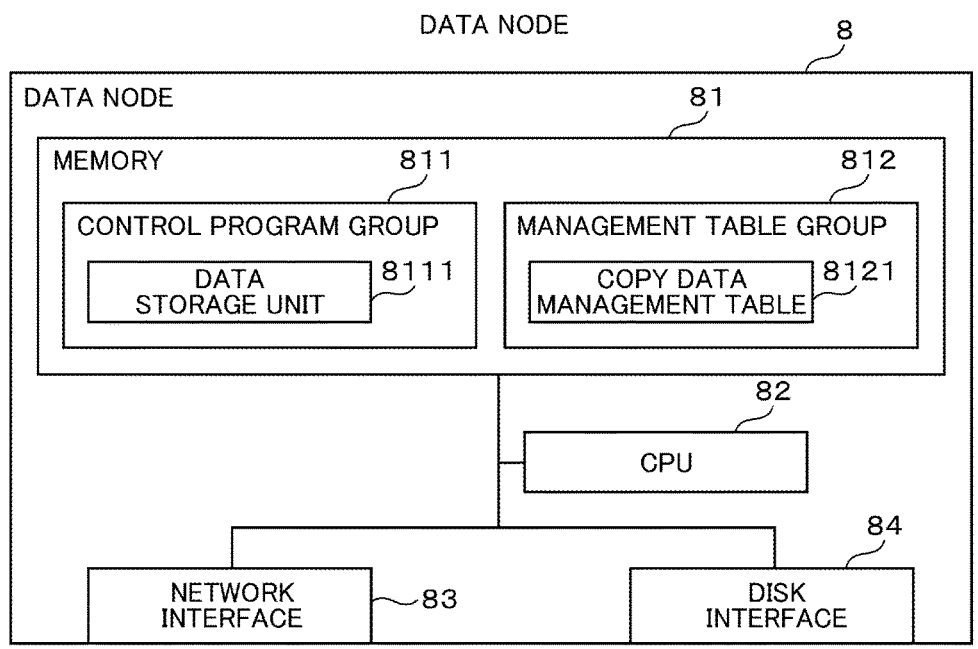
FIG. 18 A diagram illustrating an example of a configuration of a data node according to the second embodiment.

FIG. 16 is a diagram illustrating an example of a configuration of a distributed processing system according to the second embodiment. In addition, each of FIGS. 17 and 18 is a diagram showing an example of the configuration of each worker node 5 and each data node 8 in the second embodiment. As is apparent from FIGS. 16 to 18, a data placement management unit 5113 and a data storage unit 5114 described in the first embodiment are separated from each other, and the data storage unit 5114 is set as a data storage unit 8111 of the data node 8. As a result, a load of the data copy processing does not affect a task execution processing in the worker node 5 to improve the task processing performance in a normal state.

First, the configuration of the distributed processing system will be described with reference to FIG. 16. A master node 2 and a client terminal 3 are connected to a plurality of the worker nodes 5 through a network switch 4 and the plurality of worker nodes 5 are connected to a plurality of data nodes 8 through a network switch 9, and the master node 2 and the respective data node 8 are connected to a storage device 7 through a storage switch 6. The network switch 4 and the network switch 9 may be shared, and configured by one network switch.

As shown in FIG. 17, the worker node 5 includes a task execution unit 5111, a local cache management unit 5112, and a data placement management unit 5113 as a control program group 511 in the memory 51. Each of those units is a program and is divided for ease of description, but may be realized collectively or may be arbitrarily divided for convenience of implementation. Further, each of the worker nodes 5 has a network interface 55 for connecting with the network switch 9. The network interface 55 may be shared with the network interface 53.

The worker node 5 includes a local task management table 5121 and a local cache management table 5122 as a management table group 512 in the memory 51. The respective configurations of the worker node 5 have already been described, but the data storage unit 5114 and the copy data management table 5123 are not present, and the local cache management unit 5112 and the data placement management unit 5113 can communicate with the data node 8 through the interface 55.

As shown in FIG. 18, the data node 8 has a data storage unit 8111 as a control program group 811 in the memory 81. The data storage unit 8111 is different in a physical storage location called the data node 8, and therefore denoted by different codes, but it is a program for performing the same processing as that of the data storage unit 5114. The data storage unit 8111 according to the second embodiment communicates with the worker node 5 through the network interface 83, for an exchange between the local cache management unit 5112 and the data placement management unit 5113, and the data storage unit 5114 in the first embodiment.

In addition, a copy data management table 8121 is provided as a management table group 812 in the memory 81. Since the physical storage location of the data node 8 is also different in the copy data management table 8121, different codes are added, but information having the same configuration as the copy data management table 5123 is stored.

As described above, the data placement management unit 5113 is disposed on the worker node 5, the data storage unit 8111 is separately disposed on the data node 8 which is physically different from the worker node 5, and the data placement control is performed through the network. As a result, the data node 8 can bear a load of the data copy processing, and the load does not affect the task execution processing in the worker node 5 so that the task processing performance in the normal state can be improved.

Third Embodiment

A third embodiment is different from the first and second embodiments in that when data is registered as a cache on a memory, the data is registered in a worker node 5 different from another worker node 5 that has generated cache data. In the following description, cache registration processing will be exclusively described in detail. In the description of the third embodiment, the same configuration and the same processing as those of the first embodiment or the second embodiment are denoted by the same reference numerals, and a description of the same configuration and processing will be omitted.

Figure 19:
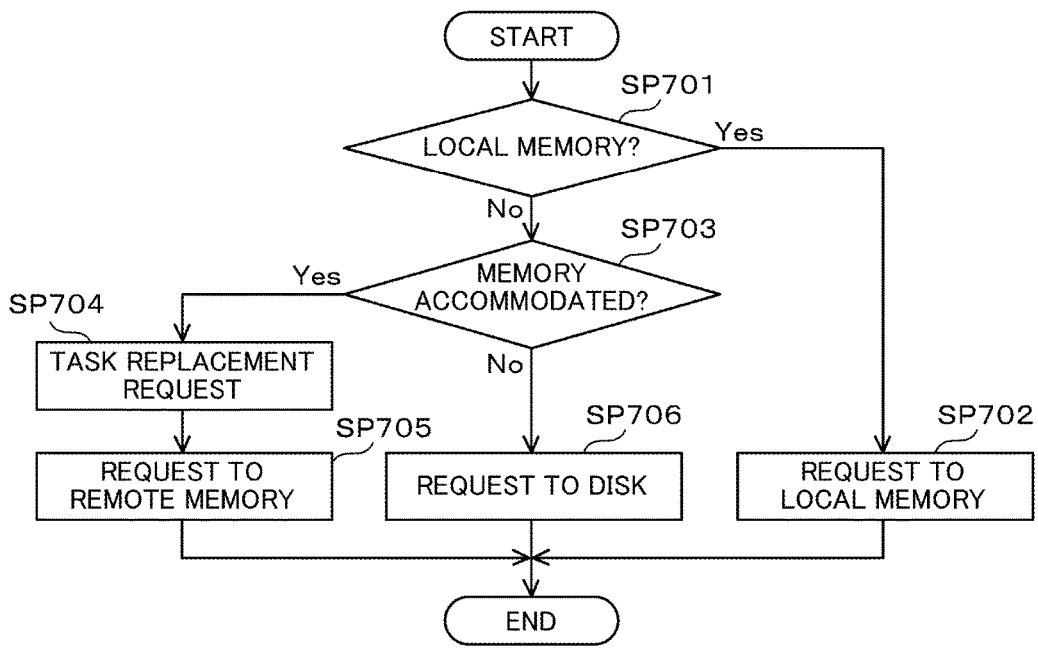
FIG. 19 A diagram illustrating an example of a process flow of cache registration according to a third embodiment.

FIG. 19 is a diagram showing an example of a process flow of cache registration according to the third embodiment. In the cache registration process of the worker node 5 already described, when the cache data cannot be placed in the memory due to insufficient memory capacity, the cache data is placed on another worker node 5, to thereby reduce the number of accesses to the storage device 7 and improve a task processing performance in a normal state.

The processing flow shown in FIG. 19 corresponds to SP401 in the cache registration processing flow described with reference to FIG. 11. The data placement management unit 5113 determines whether to register the data with the comparison of a memory capacity, a current utilization amount, and a data size designated by the registration request mounted on the worker node 5 on which the data placement management unit 5113 operates, with each other (SP701).

If data can be registered in the determination in Step SP701, the data placement management unit 5113 transmits a cache registration request to a data storage unit 5114 through a local cache management unit 5112 operating on the same worker node 5 (SP 702), and completes the cache registration processing. As a result, the data placement management unit 5113 locates the cache data in the memory of the worker node 5 on which the data placement management unit 5113 operates. The result obtained by this processing is the same as the result described with reference to FIG. 19.

In the case where data cannot be registered in the determination in Step SP701, the data placement management unit 5113 transmits a request for information on whether data can be registered or not to the data placement management unit 5113 operating on another worker node 5, and determines whether the memory of another worker node 5 can be accommodated, that is, whether data can be registered in another worker node 5 based on the acquired information (SP703).

When there are one or more worker nodes 5 that can be registered in the determination of Step SP703, the data placement management unit 5113 selects one of the worker nodes 5 as a placement destination, and transmits a task relocation request using cache data to be registered now to the schedule management unit 2111 (SP 704).

Then, the data placement management unit 5113 transmits a cache registration request to the data storage unit 5114 through the local cache management unit 5112 operating on the selected worker node 5 (SP705), and completes the cache registration processing. As a result, the memory of the selected worker node 5 serves as a remote memory, and the cache data is placed on the remote memory.

Incidentally, when selecting the worker node 5 of the placement destination, the worker node 5 may be selected as follows.
- Select a worker node largest in available memory space
- Select a worker node lowest in a CPU load
- Select a worker node lowest in the number of tasks registered in the local task management table 5121.

In addition, when one worker node 5 cannot be determined by one selection, the work node 5 may be selected based on a combination with another selection.

If there is no registerable worker node 5 in the determination in Step SP703, the data placement management unit 5113 issues a data placement request to the storage device 7 through the local cache management unit 5112 operating on the same worker node 5 (SP706), and completes the cache registration processing. As a result, the data placement management unit 5114 places the data on the disk device 71 of the storage device 7.

As described above, in the cache registration processing in the worker node 5, even when the cache data cannot be placed in the memory due to insufficient memory capacity, the cache data can be placed on another worker node 5, thereby being capable of reducing the number of accesses to the disk device 71 of the storage device 7, and improving the task processing performance in the normal state.

In the first to third embodiments described above, the SLA requirements related to downtime may be managed and the restoration processing may be executed from restrictive data in the restoration processing at the time of failure occurrence. Further, data to be cached may be compressed and/or divided for management.

REFERENCE SIGNS LIST

2 Master node,
2111 Schedule management unit,
2112 Task placement management unit,
2113 Cache management section,
2121 Task management table,
2122 Task placement management table,
2123 Cache management table,
5 Worker node,
5111 Task execution unit,
5112 Local cache manager,
5113 Data placement management unit,
5114, 8111 Data storage unit,
5121 Local task management table,
5122 Local cache management table,
5123, 8121 Copy data management table,
8 Data node.

The invention claimed is:

1. A distributed processing system including a plurality of worker nodes each having a set worker node identifier and each having a memory for caching data, the distributed processing system comprising:
a first worker node in the plurality of worker nodes, which has a first worker node identifier set in the worker node identifiers, caches first output data that is an execution result of a first task in a first memory provided in a subject worker node according to a cache request, and copies the first output data onto another worker node;
a second worker node in the plurality of worker nodes, which has a second worker node identifier set in the worker node identifiers, and caches a copy of the first output data in a second memory provided in the subject worker node; and
a master node that has information on the first worker node identifier, and selects the first worker node based on the information on the first worker node identifier if a worker node to which a second task that receives the first output data is allocated is the first worker node.

2. The distributed processing system according to claim 1, wherein the master node includes:
a cache management unit that manages the first output data and the information on the identifier of the first worker node;
a schedule management unit that registers a processing request including a task from an application,
determines whether the first output data has been cached in the first worker node based on the managed information, selects the first worker node if it is determined that the first output data has been cached, selects an arbitrary worker node if it is determined that the first output data has not been cached,
registers a processing state of the task,
repeats the selection and the registration until the processing state of all of the tasks included in the processing request has been processed, and responds to the application if all of the tasks have been processed; and
a task placement management unit that requests the execution of the second task that inputs the first output data to the selected worker node,
registers the selected worker node and the second task in association with each other,
detects a failure of the first worker node, and determines whether reexecution of the task is necessary and registers the information on the first worker node upon receiving a restoration notification of the first worker node,
the first worker node includes:
an interface to a storage device that stores output data;
a task execution unit that receives and registers a request for execution of the second task of the task placement management unit,
acquires the first output data,
executes the second task,
determines whether to cache second output data that is the execution result of the second task,
stores the second output data in the storage device,
notifies the task placement management unit of the completion of execution of the second task, and
transmits the restoration notification at the time of restoration of the first worker node; and
a data placement management unit that determines whether the first output data has been cached in the first worker node as the acquisition of the first output data, and acquires the first output data from the storage device if it is determined that the first output data has not been cached,
performs cache registration processing on the second output data when the second output data is less than a remaining capacity of the first memory if it is determined that the second output data is cached;
a data storage unit that caches the first output data or the second output data in the first memory in response to the cache registration processing, and
issues a request for copying the first output data or the second output data; and
a local cache management unit that registers the information on the first output data or the second output data cached in the first memory in response to the cache registration processing, and
the second worker node includes:
a data storage unit that caches a copy of the first output data or the second output data in the second memory based on the copy request from the data storage unit of the first worker node,
detects a failure of the first worker node, registers information on the copy of the first output data as the information on the first output data, notifies the data placement management unit of the registration of the information on the first output data, and
changes or deletes the copy data cached in the first second memory to the master;
a data placement management unit that receives a registration notification of the information on the first output data, acquires and determines the processing state of the second task from the schedule management unit, and requests the data storage unit to delete the copy of the first output data if the processing state is being processed or has been processed, and register the copy information on the first output data as the information on the first output data if the processing state is not being processed and has not been processed; and
a local cache management unit that registers the information on the copy of the first output data as the information on the first output data, and requests the cache management unit to update the information on the first output data and the information on the identifier of the second worker node.

3. The distributed processing system according to claim 1, wherein the master node requests the selected first worker node to execute the second task, and the first worker node executes the second task in response to the request for execution of the second task, and if it is determined that the second output data that is the execution result of the second task is cached, caches the second output data in the first memory, copies the second output data onto another worker node, and notifies the master node that the second output data has been cached by the first worker node.

4. The distributed processing system according to claim 3, wherein the first worker node selects another worker node that is a copy destination of the second output data from the plurality of worker nodes according to any one of the selection by a consistent hashing, the selection by round robin, the selection at random, or the selection of the worker node lower in a memory capacity utilization rate, and copies the second output data onto the selected other worker node.

5. The distributed processing system according to claim 4, wherein the first worker node acquires the cached first output data from the first memory in response to the request for execution of the second task, and executes the second task with an input of the acquired first output data.

6. The distributed processing system according to claim 5, wherein the first worker node further determines that a size of the second output data is smaller than a remaining capacity of the first memory if it is determined that the second output data that is the execution result of the second task is cached, and caches the second output data in the first memory.

7. The distributed processing system according to claim 6, wherein the second worker node monitors a failure of another worker node, updates an attribute of the copy of the first output data cached in the second memory from a slave to a master if it is determined that the failure of the first worker node has been detected, determines that the second task is in a state before being registered to be being processed, and issues, to the master node, a request for updating the information on the first worker node identifier provided in the master node to the information on the identifier of the second worker node, and
the master node updates the information on the first worker node identifier provided in the master node to the information on the identifier of the second worker node in response to the request for updating from the second worker node.

8. The distributed processing system according to claim 7, wherein the master node selects the first worker node based on the information on the first worker node identifier, and upon detecting the failure of the first worker node, issues the request for execution of the second task to the third worker node, and registers that the second task is being processed, and
the second worker node detects the failure of the first worker node, and deletes the first output data stored in the second memory if the second task is registered to be being processed in the third worker node.

9. The distributed processing system according to claim 8, wherein the master node detects the failure of the first worker node, and issues the request for execution of the second task to the worker nodes other than the first worker node.

10. A task processing method for a worker node, the worker node executing processing comprising:
receiving an identifier of a first task required for execution and an identifier of first data input to the first task;
determining whether the first data has been cached in a memory of the worker node based on the identifier of the received first data;
acquiring the first data from the memory if a result of determining whether the first data has been cached is determined to be cached;
executing the first task with an input of the acquired first data;
determining whether second data that is the execution result of the first task is to be cached; and
if a result of determining that the second data is cached is determined to be cached, caching the second data in the memory, notifying that the second data has been cached by the worker node, and copying the second data onto another worker node.

11. The task processing method for the worker node according to claim 10,
wherein the worker node:
detects a failure of another worker node;
acquires information on an execution state of a third task with an input of third data if third data that is a copy of data cached in another worker node whose failure is detected is provided;
determines information on the acquired execution state, and deletes the third data from the memory if it is determined that the information on the execution state is determined as information being executed; and
notifies that the third data has been cached in the worker node if the information on the execution state is determined as information before being executed.

12. A storage medium that stores a program of a worker node having a CPU, the program to be executed by the CPU comprising:
receiving an identifier of a first task required for execution and an identifier of first data input to the first task;
determining whether the first data has been cached in a memory of the worker node based on the identifier of the received first data;
acquiring the first data from the memory if a result of determining whether the first data has been cached is determined to be cached;
executing the first task with an input of the acquired first data;
determining whether second data that is the execution result of the first task is to be cached; and
if a result of determining the second data is cached is determined to be cached, caching the second data in the memory, notifying that the second data has been cached by the worker node, and copying the second data onto another worker node.

13. The storage medium according to claim 12, further storing a program to be executed by the CPU, comprising:
detecting a failure of another worker node;
acquiring information on an execution state of a third task with an input of third data if third data that is a copy of data cached in another worker node whose failure is detected is provided;
determining information on the acquired execution state, and deletes the third data from the memory if it is determined that the information on the execution state is determined as information being executed; and
notifying that the third data has been cached in the worker node if the information on the execution state is determined as information before being executed.

* * * * *